(12) United States Patent
Muljono (10) Patent No.: US 7,935,390 B2
(45) Date of Patent: May 3, 2011

(54) ELECTROSTATIC LUBRICANT DISPENSING SYSTEM

(75) Inventor: Eric Budi Muljono, Derry, NH (US)

(73) Assignee: Spraying Systems Co., Wheaton, IL (US)

( * ) Notice: Subject to any disclaimer, the term of this patent is extended or adjusted under 35 U.S.C. 154(b) by 147 days.

(21) Appl. No.: 12/162,742

(22) PCT Filed: Feb. 2, 2007

(86) PCT No.: PCT/US2007/002842
§ 371 (c)(1),
(2), (4) Date: Sep. 22, 2008

(87) PCT Pub. No.: WO2007/092288
PCT Pub. Date: Aug. 16, 2007

(65) Prior Publication Data
US 2009/0045270 A1 Feb. 19, 2009

Related U.S. Application Data

(60) Provisional application No. 60/764,525, filed on Feb. 2, 2006.

(51) Int. Cl.
*B05D 1/04* (2006.01)
*B05B 5/025* (2006.01)

(52) U.S. Cl. ........ 427/479; 427/482; 427/486; 118/624; 118/625; 118/629

(58) Field of Classification Search .................. 427/479, 427/482, 486; 118/624, 629
See application file for complete search history.

(56) References Cited

U.S. PATENT DOCUMENTS

| | | | |
|---|---|---|---|
| 4,210,935 A | | 7/1980 | Mitchell et al. |
| 4,401,188 A | * | 8/1983 | Weis et al. ............... 184/15.3 |
| 5,176,321 A | * | 1/1993 | Doherty ........................ 239/3 |
| 5,943,855 A | | 8/1999 | Morimoto et al. |
| 6,045,301 A | | 4/2000 | Kammermeier et al. |
| 2004/0155068 A1 | | 8/2004 | Weigand et al. |
| 2005/0194476 A1 | | 9/2005 | Muljono |

FOREIGN PATENT DOCUMENTS

JP 2003 106496 A 4/2003

* cited by examiner

*Primary Examiner* — Frederick J Parker
(74) *Attorney, Agent, or Firm* — Leydig, Voit & Mayer, Ltd.

(57) ABSTRACT

A lubricant dispensing system is provided. The dispensing system includes a lubricant supply, a lubricant dispensing nozzle and a control panel. The dispensing nozzle includes a nozzle body with a fluid passageway therein which is in fluid communication with the lubricant supply, an electrode assembly for electrostatically charging lubricant in the fluid passageway and at least one discharge orifice through which electrostatically charged lubricant can be discharged. The discharge orifice is defined by at least one spray needle having a first end in fluid communication with the fluid passageway and a second end that extends outward of the nozzle body. The control panel directs the flow of lubricant from the lubricant supply to the lubricant dispensing nozzle and controls the electric power supplied to the electrode assembly.

26 Claims, 5 Drawing Sheets

ELECTROSTATIC LUBRICANT DISPENSING SYSTEM

CROSS-REFERENCE TO RELATED APPLICATIONS

This patent application claims the benefit of U.S. Provisional Patent Application No. 60/764,525, filed Feb. 2, 2006.

FIELD OF THE INVENTION

The present invention relates to generally to spray nozzle assemblies, and more particularly spraying systems for directing lubricants onto metal parts.

BACKGROUND OF THE INVENTION

In many manufacturing operations, such as in connection with the manufacture or use of sprocket driven chains, metal stamping operations, or steel fabrication, it is necessary to direct lubricant onto specific areas of the metal parts. Conventional lubricant application systems frequently result in over spraying or excessive application of lubricant to the target area in order to ensure coating of specific areas critical for lubrication. Air atomized spraying also can create fogging that results in further waste and contamination of the work area. In the lubrication of sprocket driven chains, by way of example, it is necessary only to lubricate the area where pins and rollers of the chain are subject to shock loading and wear. To lubricate such pin and roller joints, it is known to use drip lubricators which dispense small droplets of lubricant onto the moving chain. Since the chains often are moved at high rates of speed, such as up to 400 fpm, however, the droplets are not effective for lubricating every pin. Moreover, the lubrication that is dispensed in each droplet far exceeds the amount necessary for lubrication. Hence, considerable waste results, as well as contamination to the surrounding work environment.

OBJECTS AND SUMMARY OF THE INVENTION

It is an object of the present invention to provide a lubricant dispensing system adapted for specifically directing lubricant to critical areas without over spraying, misapplication, or contamination of the work environment.

Another object is to provide a lubricant dispensing system for roller/link chains which is adapted for directing precisely controlled small quantities of liquid to each pin and roller junction of the chain, even during high speed movement of the chain.

A further object is to provide a chain lubricant dispensing system as characterized above which is applicable for spraying each pin/roller connection without excessive waste from overspray, excessive application or fogging. A related object is to provide such a chain lubricant dispensing system which can be operated with oil savings of up to 95% as compared to conventional oil drip lubricators.

Another object is to provide a lubricant dispensing system that is compact in size.

Other objects and advantages of the invention will become apparent upon reading the following detailed description and upon reference to the drawings, in which:

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF PREFERRED EMBODIMENT

Figures 1, 2, 3:
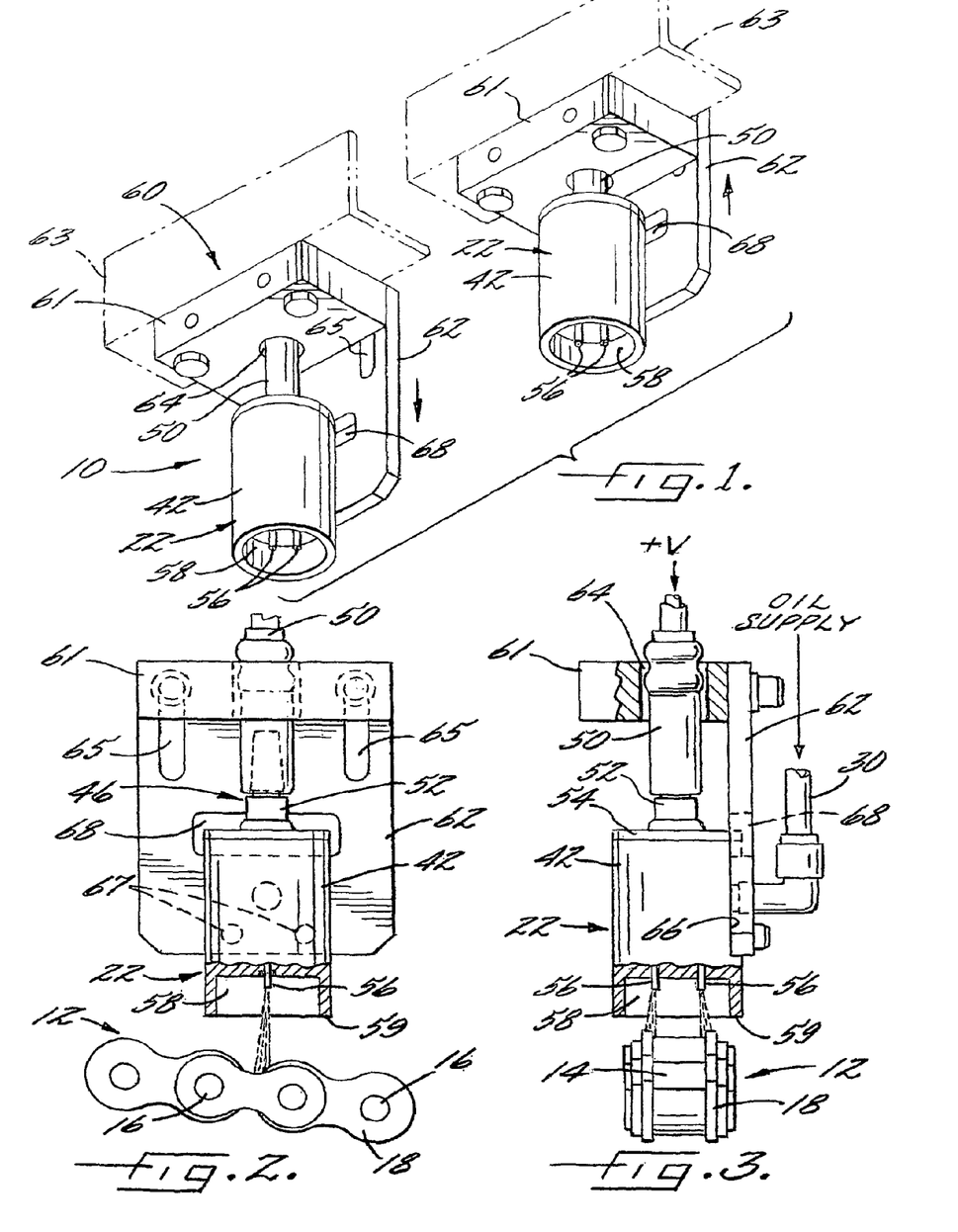
FIG. 1 is perspective view of an illustrative lubricant dispensing system according to the present invention including, in this case, a pair of dispensing nozzles.
FIG. 2 is a partially cutaway front view of the dispensing nozzle and mounting bracket of FIG. 1 showing the nozzle dispensing lubricant onto a moving chain.
FIG. 3 is a partially cutaway side view of the dispensing nozzle and mounting bracket of FIG. 1 showing the nozzle dispensing lubricant onto a moving chain.
Figures 4, 5:
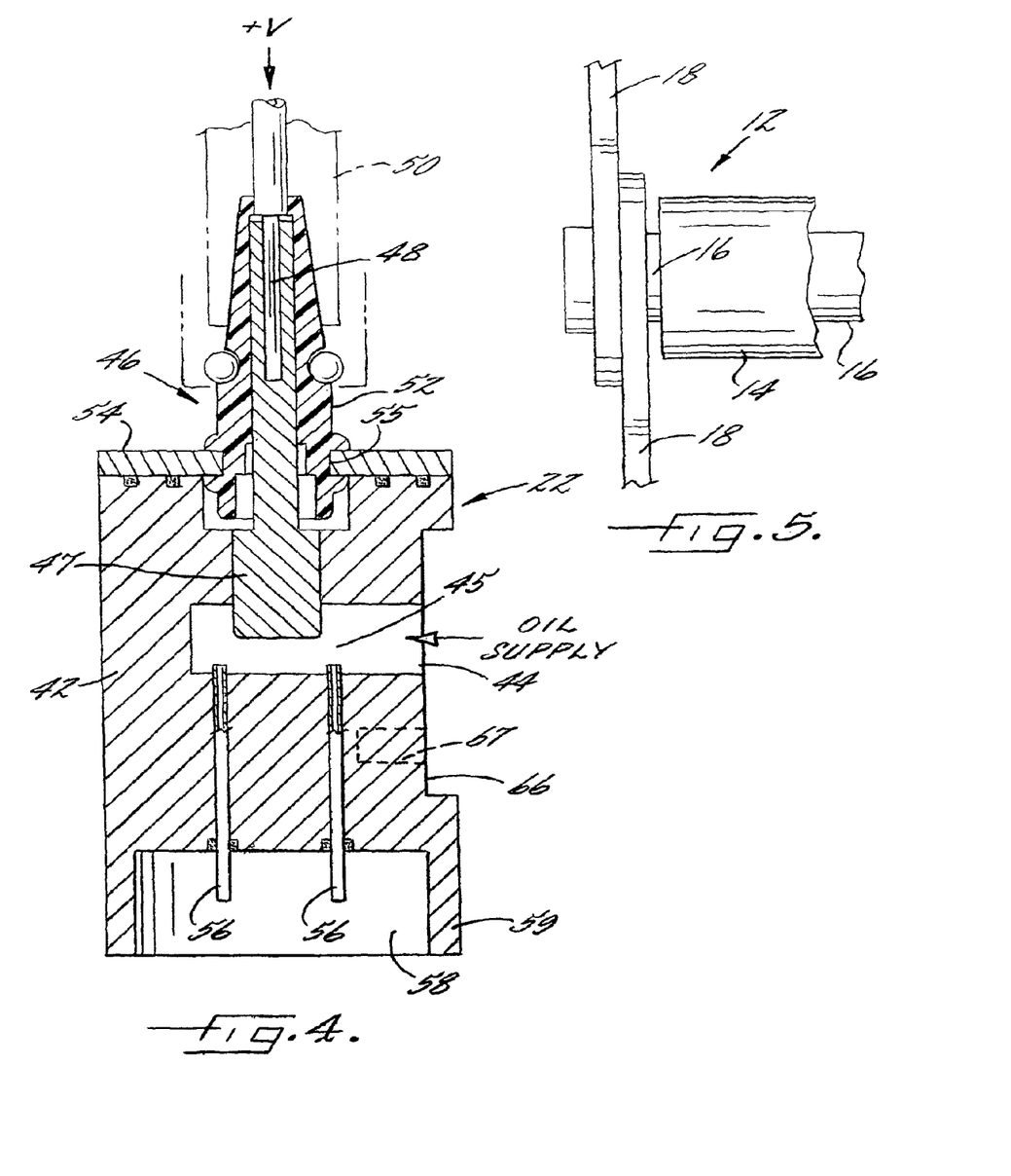
FIG. 4 is a side sectional view of the dispensing nozzle of FIG. 1.
FIG. 5 is an enlarged top view of one end of one roller and one pin of the chain of FIG. 2.

Referring now more particularly to FIG. 1 of the drawings, there is shown an illustrative lubricant dispensing system 10 in accordance with the invention. The illustrated lubricant dispensing 10 is designed for use in applying a lubricant such as oil to the pin and roller junctions of a sprocket driven chain 12 (see FIGS. 2 and 3). As shown in FIG. 5, such chains 12 typically comprise longitudinally spaced rollers 14 supported by respective pins 16, which in turn are connected by links 18 on opposed sides of the rollers 14. It is commonly necessary to lubricate the junctions between the pins 16 and rollers 14 to enhance operation and prevent wear. Because of space constraints heretofore this has been difficult. Drip lubricators have been used which utilize a pinch valve or the like to control dripping of lubricant onto the moving chain at locations adjacent ends of the pins. As indicated above, such lubricating systems have been ineffective for lubricating each pin, result in costly waste, and can contaminate the surrounding work environment.

Figure 6:
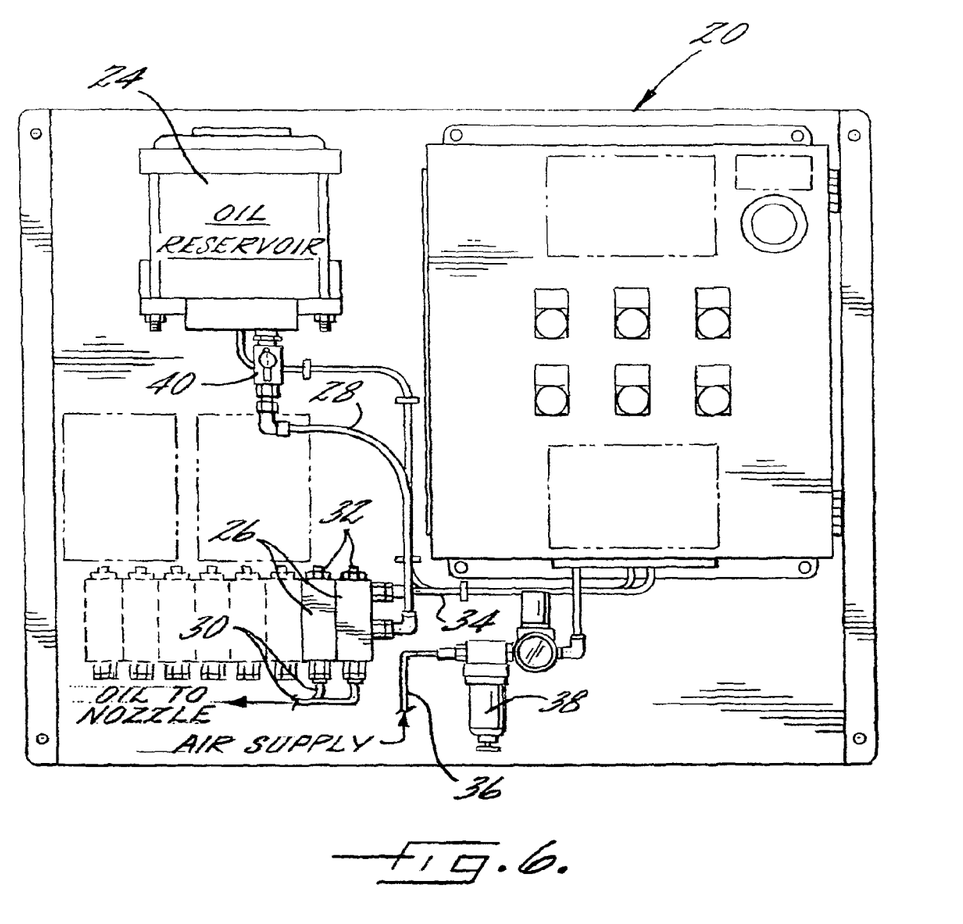
FIG. 6 is a front view of an exemplary control panel for use with the lubricant dispensing system of FIG. 1.

In the illustrated embodiment, the lubricant dispensing system includes a central control panel 20 (see FIG. 6) and one or more lubricant dispensing nozzles 22 (see FIG. 1). In this instance, the central control panel 20 controls the supply of lubricant to the lubricant dispensing nozzles 22 as well as operation of the nozzles 22. For storing the lubricant, the control panel 20 has an associated lubricant reservoir 24 as shown in FIG. 6. A filter can be integrated into the reservoir 24 or can be arranged at another suitable location within the system for removing particulates from the lubricant. In addition, the reservoir 24 can be equipped with a lubricant level sensor (e.g., a level switch) that can provide a signal to the control panel 20 to initiate a low lubricant level alarm.

For directing the lubricant from the reservoir 24 to the individual dispensing nozzles, the control panel 20 has one or more associated lubricant pumps 26 that are connected to the reservoir 24 by a reservoir outlet line 28. In this case, the control panel 20 includes a lubricant pump for each of the dispensing nozzles 22 with each pump 26 having an associated pump liquid outlet line 30 that extends to the respective dispensing nozzle. The lubricant pumps 26 can be precision pumps that are designed to operate accurately at relatively low flow rates Moreover, as shown in FIG. 6, each pump 26 can have an adjustment screw 32 for adjusting the flow rate being produced by the pump. In the illustrated embodiment, the pumps 26 are operated via compressed air which is supplied to the pumps through an air supply line 34. The control panel 20 further includes a compressed air supply hook-up 36 with an associated filter/regulator 38 for connecting to a pressurized air supply. The flow of compressed air to the pumps 26 and hence stop and start operation of the pumps is controlled, in this case, by a solenoid valve that is actuated by a programmable controller provided in the control panel 20. Additionally, a control valve 40 is provided in the reservoir outlet line 28 which can be used to shut-off the flow of lubricant to the pumps 26. This valve 40 can also be tied into the programmable controller in the control panel 20.

The illustrated spray nozzle 22 includes a generally cylindrical nozzle body 42 that includes a fluid inlet 44 on the side thereof to which the fluid line 30 from the respective pump 26 can be connected (see FIGS. 1-4). Preferably, the connection between the fluid line 30 from the pump 26 and the nozzle fluid inlet utilizes a quick disconnect type fitting in order to simplify set-up and installation of the system. As shown in FIG. 4, the nozzle fluid inlet 44 communicates with a fluid passageway 45 that in this case extends laterally through the interior of the nozzle body 42. The nozzle body 42 may be machined from any suitable non-electrically conductive material such as a plastic material.

In accordance with the invention, each lubricant dispensing nozzle 22 is adapted for electrostatically charging and directing lubricant to specific small critical areas of each pin and roller junction of a moving chain without over spraying and costly wastage. To this end, in the illustrated embodiment as best depicted in FIG. 4, the spray nozzle 22 has an electrode assembly 46 for charging liquid as it is directed through the nozzle. In this case, the electrode assembly 46 includes a conductor element 47 that is supported in the nozzle body and extends into the fluid passageway 45. The conductor element 47 can be made of any suitable electrically conductive material and can be press fit into the nozzle body 42 through a corresponding opening in the upper end of the nozzle body.

To permit connection to a high voltage source, the conductor element 47 has an elongated receptacle 48 extending from its upper end for receiving a mating pin of a high voltage cable 50 (shown in broken lines in FIG. 4). To facilitate this connection, a connector fitting 52 engages the conductor element 47 and protrudes outward from the nozzle body 42. In this case, the connector fitting 52 comprises a connector plug that fits over the upper portion of the conductor element 47 and is configured for a quick disconnect type connection to the high voltage cable 50. To help hold the connector fitting 52 to the nozzle body 42, a nozzle cover 54 is provided that is placed on the upper surface of the nozzle body 42. The nozzle cover 54 has a central opening the edge of which engages with a circumferential groove 55 in the outer surface of the connector fitting 52 as shown in FIG. 4. The nozzle cover 54 can be secured to the connector fitting 52 and on the nozzle body 42 by a suitable adhesive.

In this instance, the high voltage cable 50 that connects to the nozzle electrode assembly 46 is routed from the control panel 20 which provides the high voltage power supply for the system. According to one preferred embodiment, the control panel 20 provides a relatively low voltage of approximately 15-20 kv at a very low current of less than 0.4 mA. Moreover, the control panel 20 can be configured to provide a high voltage arcing alarm as well as an automatic high voltage shut-off during arcing.

For precisely directing the charged lubricant onto a desired area, in this case the junctions between the pins 16 and the rollers 14 of the chain 12, the nozzle assembly includes a discharge orifice in the form of a projecting small diameter tubular spray needle 56. In particular, in the illustrated embodiment, the spray nozzle 22 includes two such spray needles 56 (see FIGS. 3 and 4), which may be press fit the nozzle body 42 and held in place by an appropriate adhesive. The use of two spray needles 56 allows a single spray nozzle 22 to simultaneously target lubricant at the pins 16 at both ends of a chain roller 14 as shown in FIG. 3. The upper end of each spray needle 56 is in communication with the fluid passageway 45 and the opposing lower end projects outward from the nozzle body 42 as shown in FIG. 4. In this case, the upper end of each spray needle 56 extends a short distance above the bottom surface of the fluid passageway 45 to help prevent sediment in the lubricant fluid from clogging the spray needles. The spray needles 56 are preferably constructed of a suitable corrosion resistant, electrically conductive material, such as stainless steel. The spray needles 56 preferably have an inside diameter of between approximately 0.030 and 0.045 inches depending on the desired fluid flow rate through the spray needle.

In operation, lubricant directed into the nozzle 22 through the fluid inlet 44 is directed into fluid passageway 45 wherein it subjected to high voltage via the conductor element 47. The electrically charged lubricant is then discharged from the nozzle 22 through the spray needles 56. In keeping with the invention, the spray needles 56 are effective for discharging lubricant in a substantially continuous small diameter flow stream that can be continuously directed to small passing target areas. In the illustrated embodiment, the target area is the relatively small gap areas between the ends of each roller 14 and the adjacent chain link 18 such that the lubricant will flow to the area between the pin 16 and roller 14 which is subject to maximum shock loads and wear during usage (see FIG. 3) The lubricant also can be directed to the areas between the links 18 of the chain, which are also subject to wear. It will be appreciated by one skilled in the art that because of the electrostatic charge, while the flow stream is substantially continuous in nature, it can be effectively directed only onto the target area of the metal parts, without over spraying or misapplication. More particularly, when the charged lubricant flow stream is directed to the moving chain, as illustrated, the charged lubricant will be attracted to the target area of the moving pin while it is in proximity to the spray nozzle needle and will then jump to the succeeding pin of the moving chain without misdirection onto other parts of the chain or work environment and without any substantial waste. This is believed to be the result of the combination of the electrostatic charge on the lubricant and its attraction to the metal target areas, and the spacing and speed of the pins which are passing the dispensing needles 56.

The significant advantage of this is that lubricant waste is largely eliminated. Indeed, in a chain lubricating dispensing operation, the dispensing system of the present invention can be operated with oil savings up to 95% over conventional oil drip lubricators. Moreover, the nozzle of the present invention has the added advantage that it does not incorporate any moving parts such as valves or the like. As a result, the nozzle is more reliable, longer lasting and easier to manufacture and assemble.

To reduce the likelihood of accidental physical contact with the high voltage, the protruding lower ends of the spray needles 56 are arranged in an open recessed area 58 in the bottom surface of the nozzle body 42 (see FIGS. 2-4). This recessed area 58 defines a skirt 59 that surrounds and protects the lower ends of the spray needles 56. In the illustrated embodiment, the ends of the spray needles 56 are spaced a distance above the lower edge of the skirt 59. In order to prevent arcing between the spray needles 56 and the chain 12, the spray needles 56 must be spaced a minimum distance away from the chain. However, this creates an open gap into which something could be inadvertently inserted, which raises a potential safety issue due to the high voltages involved in the system. Arranging the lower ends of the spray needles 56 in the recessed area 58 in the bottom of the nozzle body 42 helps address this safety issue. In particular, it allows the lower edge of the spray nozzle 22 to be placed closer to the chain while still maintaining the necessary spacing between the chain 12 and the ends of the spray needles 56. This substantially reduces any open gap between the spray nozzle 22 and the chain 12 with the the skirt 59 around the ends of the spray needles 56 serving to largely block anything from being inserted into the space between the spray needles and the chain.

To facilitate positioning of the spray nozzle 22 relative to the specific area to be lubricated, the lubricant dispensing system can include a nozzle mounting bracket 60. In this case, as shown in FIGS. 1-3, the nozzle mounting bracket 60 has L-shaped configuration comprising two parts including a first horizontal section 61 and a second vertical section 62. The horizontal section 61 of the nozzle mounting bracket 60 is intended to be secured via, for example, bolts to a support member 63 (shown in broken lines in FIG. 1) or other structure associated with the sprocket driven chain drive that is to be lubricated. In this case, the horizontal section 61 of the mounting bracket 60 includes a central opening 64 (see, e.g., FIG. 3) through which the high voltage cable 50 for the spray nozzle can be fed to the connector fitting 52 on the top of the nozzle body 42.

The second vertical section 62 of the mounting bracket 60 is secured at its upper end to the horizontal section 61 and near its lower end to the nozzle body 42. To allow connection to the horizontal section 61, the vertical section 62 includes a pair of mounting openings 65 adjacent its upper end. In this case, the mounting openings 65 are elongated in the vertical direction to permit adjustment in the position of the spray nozzle 22 (see FIGS. 1 and 2). The horizontal section 61 includes complementary mounting openings that can receive bolts or other mounting hardware inserted through the mounting openings 65 in the vertical section 62 (see, e.g., FIG. 3). To provide added flexibility, the horizontal section 61 can include mounting holes on both sides so that the vertical section 62 can be mounted on either side of the horizontal section as desired for a particular application.

To facilitate connection of the vertical section 62 of the mounting bracket 60 to the nozzle body 42, the outer surface of the nozzle body 42 includes a flattened region 66 with a pair of mounting holes 67 (one is seen in shadow in FIG. 4). These mounting holes 67 align with a pair of complementary mounting holes in the vertical section 62 of the mounting bracket 60 so as to be able to receive mounting bolts or other fastening hardware (see FIG. 3). The flattened section 66 of the nozzle body 42 allows the nozzle body to be drawn tightly against the vertical section 62 of the mounting bracket thereby helping to ensure that the nozzle 22 is precisely oriented relative to the target area. The vertical section 62 of the mounting bracket also includes a generally horizontally extending opening 68 (see FIGS. 1 and 2) that receives the rounded section of the nozzle body 42 above the flattened region 66 when the nozzle body 22 is secured to the vertical section 62 (see, e.g., FIG. 3) thereby further ensuring the precise positioning of the nozzle body 42. In this case, the fluid inlet 44 is located in the flattened region 66 of the nozzle body 42 and the vertical section 62 includes an opening through which the fluid line 30 from the pump can be fed to the fluid inlet (see. e.g., FIG. 3.

Figures 7, 8:
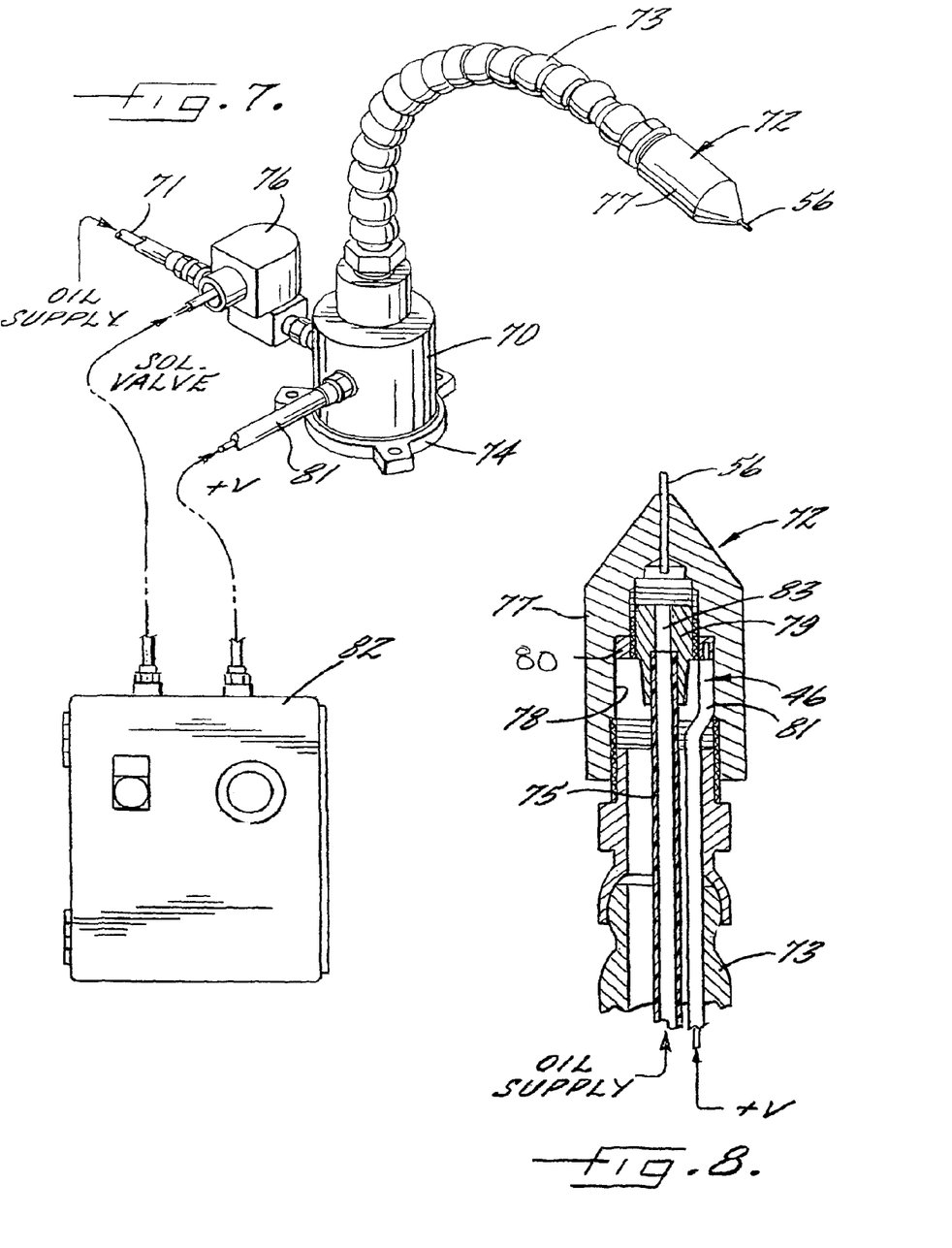
FIG. 7 is a perspective view of an alternative embodiment of a lubricant dispensing system according to the present invention.
FIG. 8 is a side sectional view of the dispensing nozzle of the lubricant dispensing system of FIG. 7.

According to a further embodiment of the present invention shown in FIGS. 7 and 8, an electrostatic lubricant dispensing nozzle according to the invention can be equipped with a flexible support assembly that provides additional variability relative to the positioning of the spray nozzle relative to the specific area to be lubricated. In particular, the embodiment of FIGS. 7 and 8 includes a stationary support base 70 adapted for coupling to a liquid lubricant supply line 71, a lubricant spray or dispensing nozzle 72, and a flexible support 73 for supporting the nozzle for selective positioning with respect to the base and an object or surface area to be sprayed. The base 70 and flexible support 73 may be substantially similar to those disclosed in PCT/US06/44481, filed Nov. 16, 2006, assigned to the same assignee as the present application, the disclosure of which is incorporated herein by reference. For supporting the base on a support surface or other structure, a mounting flange 74 affixed to the underside thereof, which is adapted for alternative securement on a support surface, as set forth in the above referenced application, such as by fasting bolts, a C-clamp, or magnetic securement.

As in the embodiment of FIGS. 1-4, the spray nozzle 72 of the embodiment of FIGS. 7 and 8 has an electrode assembly 46 for charging liquid as it is directed through the nozzle and a projecting small diameter tubular spray needle 56 for precisely directing charged liquid onto a desired target area. Unlike the embodiment of FIGS. 1-4, the spray nozzle 72 of FIGS. 7 and 8 includes only a single spray needle 56. The dispensing system in this case has a central lubricant supply tube 75 that communicates between the base 70 and the nozzle 72 centrally through the support 73 for directing lubricant to the nozzle. A selectively operable two-way solenoid valve 76 in this instance is provided in the main liquid supply line 71 for controlling the supply of lubricant to the base 70.

As best shown in FIG. 8, the illustrative nozzle has a gun shaped nozzle body 77 having a cylindrical upstream portion and a downstream frustoconical end from which the lubricant dispensing tubular needle 56 projects. The nozzle body 77 includes a stepped internal longitudinal passageway area 78. An upstream end of the nozzle body passageway area 78 in this case is internally threaded for engaging an externally threaded adapter end portion of the support 73. The electrode assembly 46 includes a cylindrically configured metal push-to connect fitting 71) disposed centrally within the internal passage area 78 of the nozzle body 77, which is pressed fit onto the end of the liquid supply tube and which in this case threadably engages a downstream section of the nozzle body passage area. A metal collar 80 is disposed in tight fitting closely surrounding relation to the fitting and connected to a high voltage source, in this case provided by the control panel 82, by means of high voltage wires 81 that extend from the collar 80, through the flexible support 73 and the base 70, to the power source. In operation, lubricant directed through the lubricant supply tube 75 from the base 70 will communicate with an internal charging chamber 83 of the electrode bushing 79, subjecting the lubricant to high voltage and electrically charging the liquid as it is directed to and through the nozzle body 77 and dispensing needle 56.

In the FIGS. 7 and 8 embodiment, the flexible support 73 is adapted to permit selective positioning of the spray nozzle 72, and hence lubricant dispensing needle thereof, relative to the target area to be sprayed and to retain the spray nozzle in such selected position for precise direction of the discharging lubricant to the relatively small target area. The flexible support 73 in this case is a flexible tubular member having an external surface formed with axially spaced corrugations or ribs which functionally define the equivalent of ball and socket joints for enabling the tubular member to be bent into a desired configuration and to retain such configuration. The tubular member may be of a known "stay-in-place" type tube, which is commercially available from Snap-Loc, Loc-Line, and Whitehouse Flexible Tubing, Inc. To target lubricant at the pins at both ends of a given chain roller, two nozzles and flexible support assemblies can be provided with each one being targeted at a respective one of the ends of the chain roller.

Figure 9:
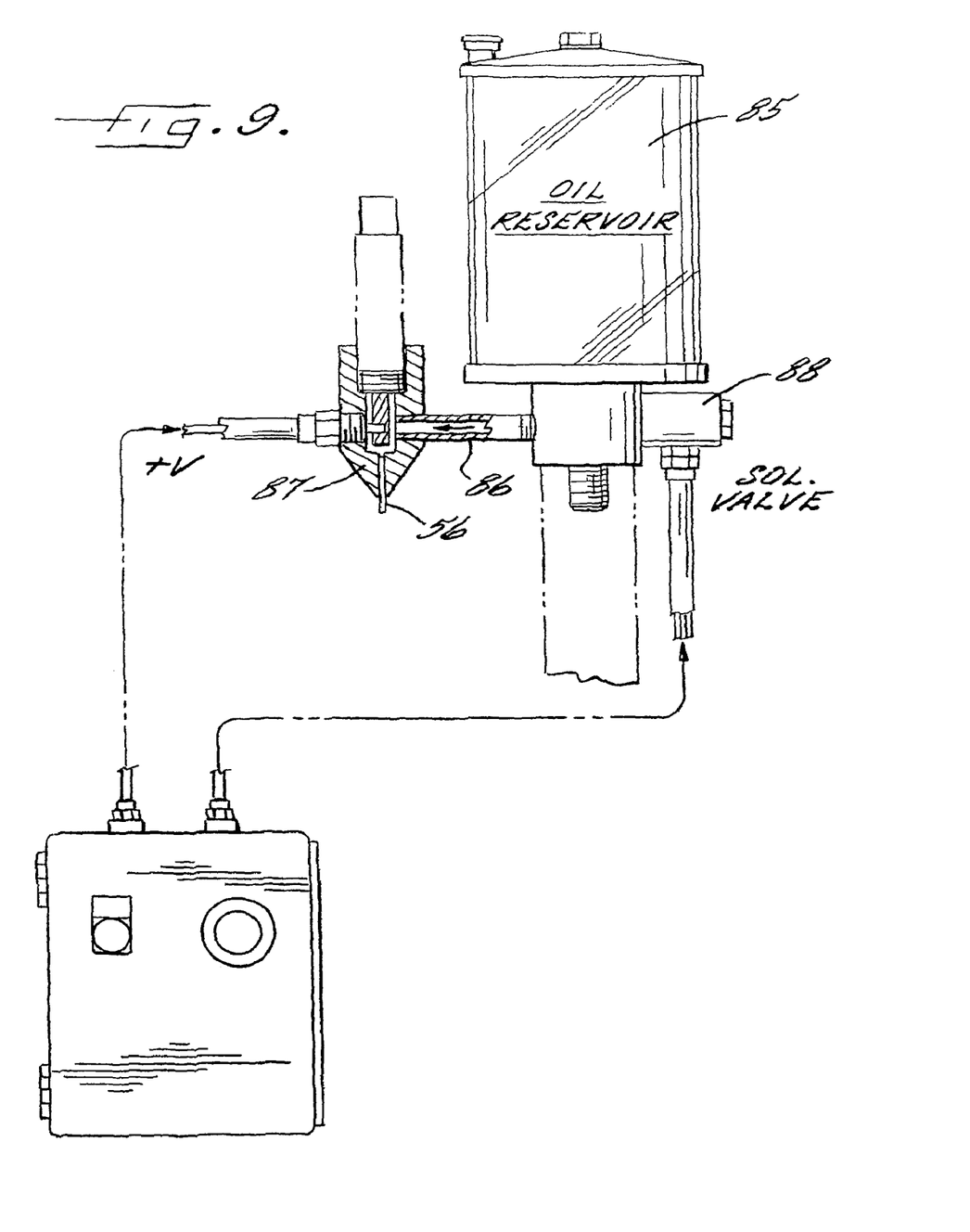
FIG. 9 is a front view of another alternative embodiment of a lubricant dispensing system according to the present invention.

According to a further embodiment of the present invention, conventional oil drip lubricators can be easily retrofitted with a lubricant dispensing system in accordance with the invention. As shown in FIG. 9, a conventional oil drip lubricating system typically includes a lubricant containing reservoir 85 and a liquid supply line 86 to which a pinch valve of the conventional type may be connected to selectively setting the flow of oil drip, via a gravity feed, from the valve onto a moving chain or other item to be lubricated. To improve the performance of the conventional system, an electrostatic spray nozzle 87 generally similar to that described above can be mounted on the liquid supply pipe and high voltage cables can be connected to the spray nozzle. In this case, the liquid supply and high voltage lines communicate with opposite sides the spray nozzle 87, rather than though a bottom axial end thereof as in the embodiment of FIGS. 7 and 8 For controlling the flow of liquid from the reservoir, a solenoid valve 88 may be connected to the underside of the reservoir as illustrated. Hence, it can be seen that the lubricating dispensing system of the present invention is adapted for easy field retrofitting of existing drip lubricators and can be operated with the advantages described above.

From the foregoing, it can be seen that the lubricant dispensing system of the present invention is adapted for specifically directing lubricant to critical relatively small areas without over spraying or other misapplication. The lubricant dispensing system has particular utility in lubricating the pin and rollers of the sprocket driven chains without substantial wastage of lubricant. Indeed, in a chain lubricating dispensing application, it has been found that the dispensing system of the present invention can be operated with substantial savings over conventional oil drip lubricators. While it has been described in the context of applying a lubricant to a chain, the lubricant dispensing system of the present invention is not limited to such application and could be used in any application requiring application of a fluid to a very small target and at a very low flow rate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed No language in the specification should be construed as indicating any non-claimed element as essential to the practice of the invention.

Preferred embodiments of this invention are described herein, including the best mode known to the inventors for carrying tout the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of lubricating a moving chain having a plurality of longitudinally spaced rollers supported by respective pins that are in turn supported in longitudinally spaced relation by side links comprising the steps of:
   providing a dispensing nozzle having a pair of discharge orifices laterally spaced apart a distance corresponding to the length of said rollers;
   supplying lubricant to the dispensing nozzle;
   electrostatically charging the lubricant in the dispensing nozzle;
   moving the chain relative to the dispensing nozzle; and
   simultaneously directing liquid streams of electrostatically charged lubricant from the discharge orifices onto location adjacent opposite lateral ends of the roller at the respective junction of the supporting pin with the roller.

2. The method of claim 1 including controlling electrostatic charging of the lubricant such that the liquid streams discharging from the discharge orifices are simultaneously directed successively onto the junctions between each roller and its respective support pin and the following roller and support pin without discharge onto the chain therebetween.

3. A lubricant dispensing system for dispensing liquid lubricant onto chains having longitudinally spaced rollers supported by respective pins which in turn are supported in longitudinally spaced relation by side links comprising:
   a lubricant supply;
   a lubricant dispensing nozzle including a nozzle body with a fluid passageway therein in fluid communication with the lubricant supply,
   an electrode assembly for electrostatically charging lubricant in the fluid passageway;
   a pair of hollow spray needles supported by said nozzle body through which electrostatically charged lubricant passes and from which it is simultaneously discharged in a pair of spaced apart liquid streams, said spray needles being spaced apart a distance corresponding to the length of said rollers for simultaneously directing lubricant onto opposite lateral ends of the roller at the respective junction with the supporting pin of the roller, and a control panel for directing the flow of lubricant from the lubricant supply to the lubricant dispensing nozzle and controlling electric power supplied to the electrode assembly.

4. The lubricant dispensing systems of claim 3 in which said control panel controls electric power supply to the electrode assembly such that liquid streams discharging from said spray needles are directed successively to the junctions between each roller and its respective support pin and the following roller and support pin without discharge onto the chain therebetween.

5. The lubricant dispensing system of claim 3 wherein the electrode assembly includes a conductor that extends into the fluid passageway.

6. The lubricant dispensing system of claim 3 wherein the spray needles each have a first end in fluid communication with the fluid passageway and a second end that extends outward of the nozzle body.

7. The lubricant dispensing system of claim 6 wherein the first end of each spray needle extends a distance into the fluid passageway.

8. The lubricant dispensing system of claim 3 further including a mounting bracket for supporting the dispensing nozzle.

9. The lubricant dispensing system of claim 8 wherein the mounting bracket includes a flexible support.

10. The lubricant dispensing system of claim 6 wherein the second end of each spray needle extends from said nozzle body into a recessed area of the nozzle body.

11. The lubricant dispensing system of claim 10 wherein the recessed area of the nozzle body defines a skirt that surrounds the recessed area and the second ends of the spray needles.

12. The lubricant dispensing system of claim 11 wherein the second end of each spray needle is spaced above a lower edge of the skirt.

13. The lubricant dispensing system of claim 5 wherein a connector fitting engages the conductor and protrudes from the nozzle body.

14. The lubricant dispensing system of claim 3 wherein the control panel includes a pump for directing lubricant from the lubricant supply to the dispensing nozzle.

15. The lubricant dispensing system of claim 14 wherein the dispensing system includes a plurality of lubricant dispensing nozzles and the control panel includes a pump for each respective dispensing nozzle.

16. A lubricant dispensing system comprising:
a lubricant supply;
a lubricant dispensing nozzle including a nozzle body with a fluid passageway therein which is in fluid communication with the lubricant supply,
an electrode assembly for electrostatically charging lubricant in the fluid passageway and at least one discharge orifice through which electrostatically charged lubricant can be discharged; said discharge orifice being defined by a hollow spray needle through which said electrostatically charged lubricant passes, said nozzle body having a recessed area that defines a skirt surrounding the recessed area, said spray needle being mounted in said body and extending into said recess, and said spray needle having a terminal end that defines said discharge orifice disposed within said recess in spaced relation above a lower edge of the skirt; and a control panel for directing the flow of lubricant from the lubricant supply to the lubricant dispensing nozzle and controlling electric power supplied to the electrode assembly.

17. The lubricant dispensing system of claim 16 wherein the first end of the spray needle extends a distance into the fluid passageway.

18. The lubricant dispensing system of claim 16 further including a mounting bracket for supporting the dispensing nozzle.

19. The lubricant dispensing system of claim 18 wherein the mounting bracket includes a flexible support.

20. The lubricant dispensing system of claim 16 wherein the dispensing nozzle has two spray needles.

21. The lubricant dispensing system of claim 16 wherein the second end of the spray needle extends from said nozzle body into a recessed area of the nozzle body.

22. The lubricant dispensing system of claim 21 wherein the recessed area of the nozzle body defines a skirt that surrounds the recessed area and the second end of the spray needle.

23. The spray nozzle assembly of claim 22 wherein the second end of the spray needle is spaced above a lower edge of the skirt.

24. A lubricant dispensing system comprising:
a lubricant supply;
a lubricant dispensing nozzle including a nozzle body with a fluid passageway therein which is in communication with the lubricant supply;
said nozzle body defining a charging chamber, said fluid passageway communicating with a lateral side of said charging chamber, an electrode extending partially into said charging chamber from a top side and having a terminal end disposed above a bottom side of said charging chamber for charging lubricant directed into the charging chamber from said fluid passageway, a hollow spray needle supported in an underside of said nozzle body in communication with said charging chamber through which electrostatically charged lubricant passes and from which it is discharged as a liquid flow stream; and a control panel for directing the flow of lubricant from the lubricant supply to the lubricant dispensing nozzle and controlling electric power supplied to the electrode assembly.

25. The lubricant dispensing system of claim 24 including a plurality of said hollow spray needles each communicating with said charging chamber for receiving and simultaneously directing a plurality of electrostatically charged lubricant flow streams.

26. The lubricant dispensing system of claim 24 including a plurality of said lubricant dispensing nozzles disposed in side by side relation and each having a fluid passage on a common side thereof communicating with said lubricant supply.

* * * * *